US012587654B2

(12) United States Patent
Schroers et al.

(10) Patent No.: US 12,587,654 B2
(45) Date of Patent: Mar. 24, 2026

(54) DETECTION OF AMOUNT OF JUDDER IN VIDEOS

(71) Applicant: Disney Enterprises, Inc., Burbank, CA (US)

(72) Inventors: Christopher Richard Schroers, Uster (CH); Blake Sloan, Los Angeles, CA (US); Mitchel Jacobs, Los Angeles, CA (US); Scott Labrozzi, Cary, NC (US); Shinobu Hattori, Los Angeles, CA (US); Felix Klose, Braunschweig (DE)

(73) Assignee: Disney Enterprises, Inc., Burbank, CA (US)

( * ) Notice: Subject to any disclaimer, the term of this patent is extended or adjusted under 35 U.S.C. 154(b) by 109 days.

(21) Appl. No.: 18/432,918

(22) Filed: Feb. 5, 2024

(65) Prior Publication Data

US 2024/0267534 A1 Aug. 8, 2024

Related U.S. Application Data

(60) Provisional application No. 63/483,508, filed on Feb. 6, 2023.

(51) Int. Cl.
*H04N 19/159* (2014.01)
*G06V 10/75* (2022.01)
*H04N 19/137* (2014.01)

(52) U.S. Cl.
CPC ......... *H04N 19/159* (2014.11); *G06V 10/751* (2022.01); *H04N 19/137* (2014.11)

(58) Field of Classification Search
CPC ... H04N 19/159; H04N 19/137; G06V 10/751
See application file for complete search history.

(56) References Cited

U.S. PATENT DOCUMENTS

| 2012/0176536 A1* | 7/2012 | Levy | H04N 7/0127 |
| | | | 348/E7.003 |
| 2020/0275050 A1* | 8/2020 | Pytlarz | H04N 19/117 |
| 2023/0088882 A1* | 3/2023 | Kanberoglu | H04N 19/137 |
| | | | 382/199 |

* cited by examiner

*Primary Examiner* — Hesham K Abouzahra

(74) *Attorney, Agent, or Firm* — Kwan & Olynick LLP

(57) ABSTRACT

A method receives a video. The method analyzes information for a pixel of a frame in the video to determine a first value and a second value for the pixel. The first value is based on an image structure formed by the pixel in the frame and the second value is based on interframe motion of the image structure at the pixel. A third value is determined for an amount of judder based on the first value and the second value. The method outputs the third value to evaluate the video.

20 Claims, 17 Drawing Sheets
(9 of 17 Drawing Sheet(s) Filed in Color)

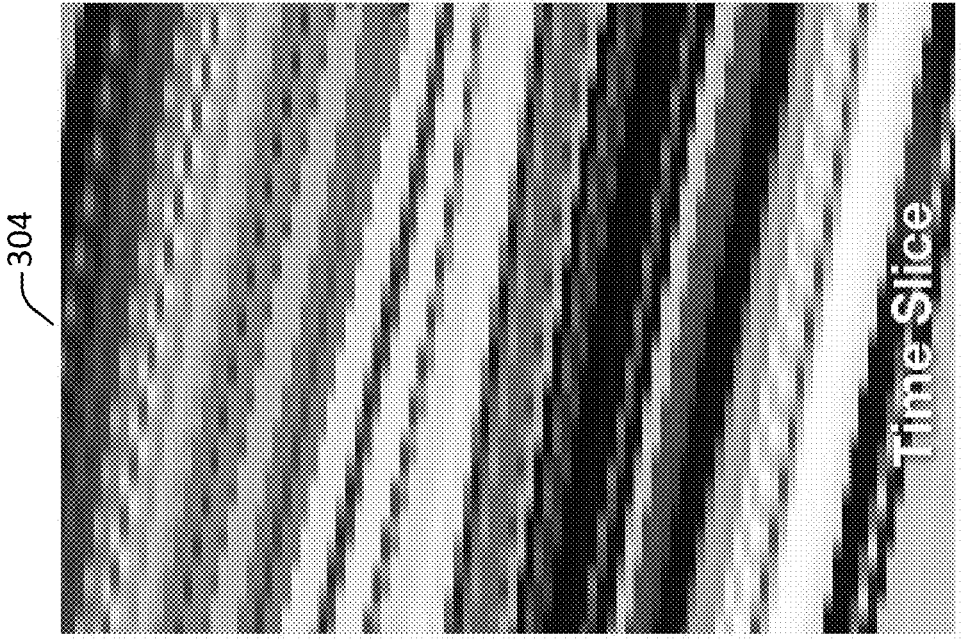
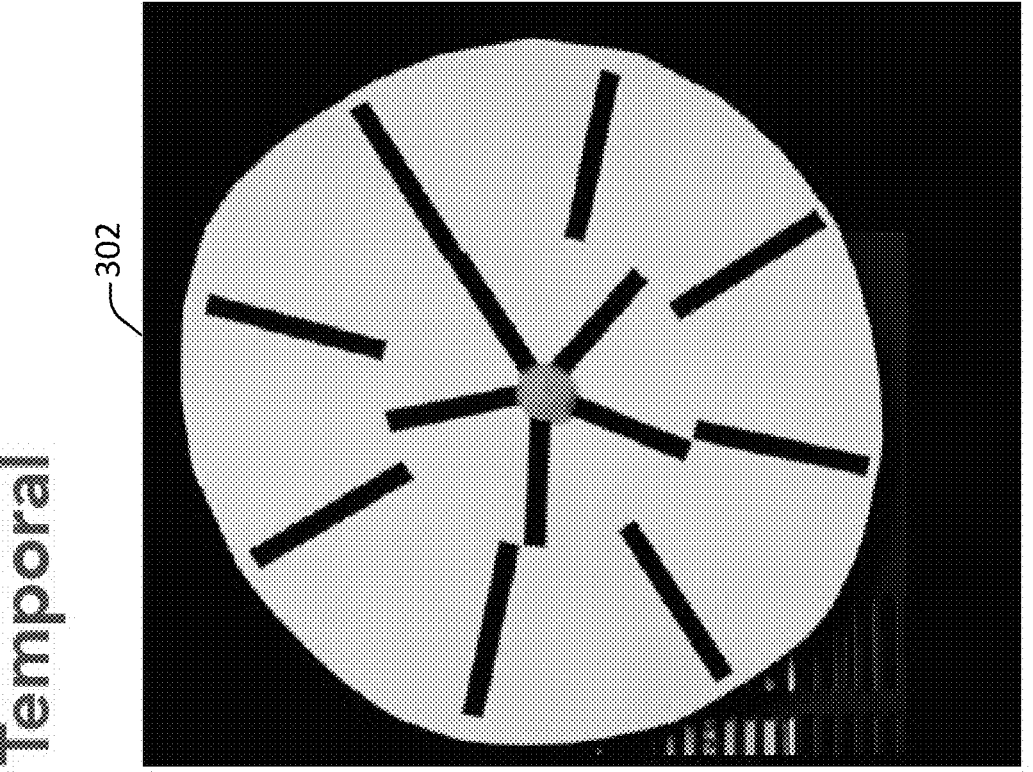
FIG. 3

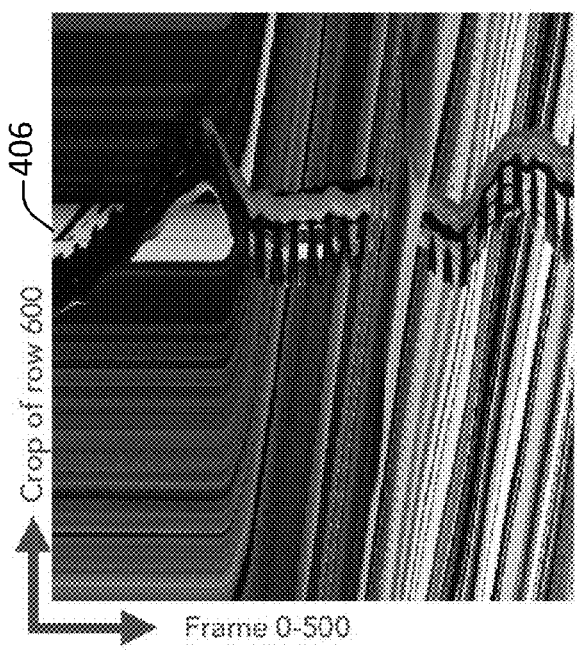
Crop of row 600
Frame 0-500
Slice
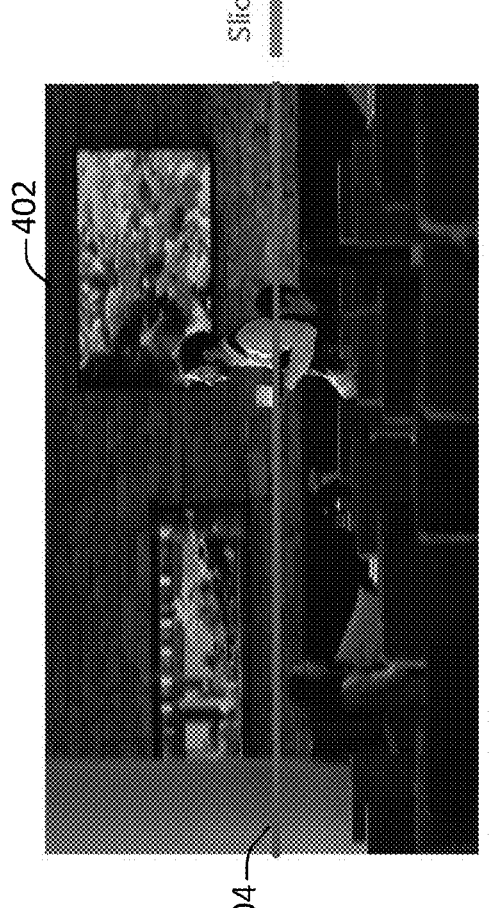
Frame 175
FIG. 4

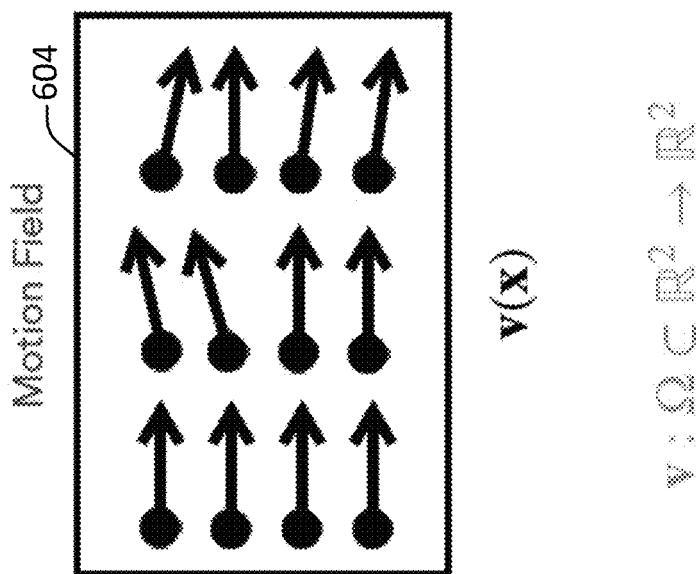
Motion Field
604
$v(x)$
$v : \Omega \subset \mathbb{R}^2 \rightarrow \mathbb{R}^2$
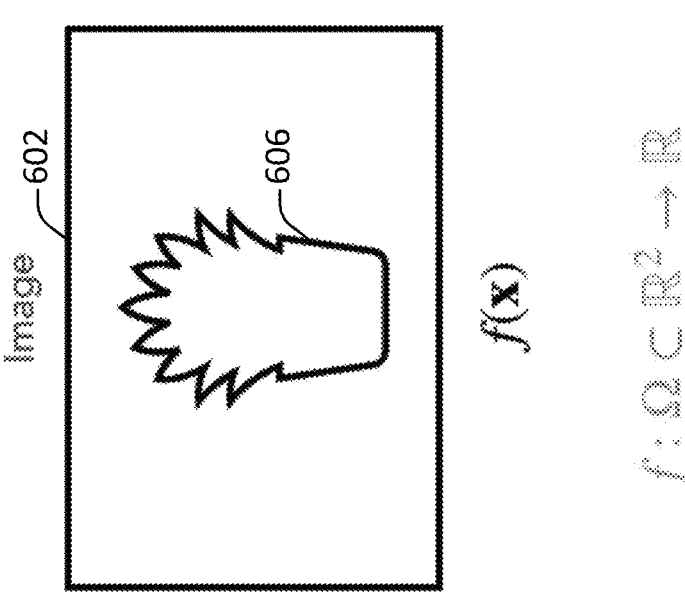
Image
602
606
$f(x)$
$f : \Omega \subset \mathbb{R}^2 \rightarrow \mathbb{R}$
FIG. 6

$$J = \sum_{x} w \left( \left| \left| \nabla_{\mathbf{v(x)}} f(x) \right| \right|, \left| \left| \mathbf{v}(x, y) \right| \right| \right)$$

$w$    Judder perception formula

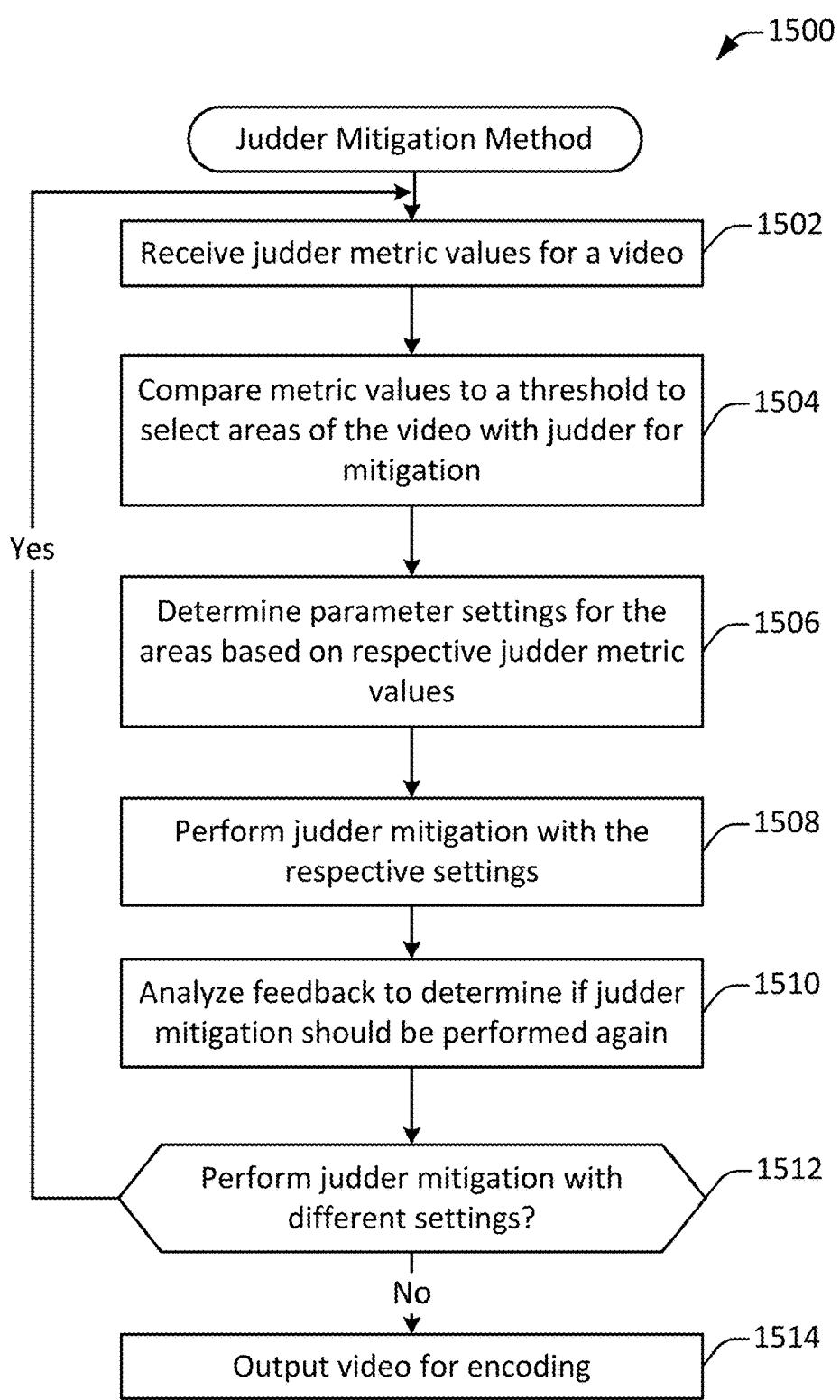

1500

Judder Mitigation Method

Receive judder metric values for a video — 1502

Compare metric values to a threshold to select areas of the video with judder for mitigation — 1504

Determine parameter settings for the areas based on respective judder metric values — 1506

Perform judder mitigation with the respective settings — 1508

Analyze feedback to determine if judder mitigation should be performed again — 1510

Perform judder mitigation with different settings? — 1512

Yes

No

Output video for encoding — 1514

| Setting | Judder Metric Value |
|---|---|
| 1.0 Step + 0.0 Linear | 1.00 (Inacceptable Judder) |
| 0.75 Step + 0.25 Linear | 0.75 (Very Bad Judder) |
| 0.5 Step + 0.5 Linear | 0.50 (Bad Judder) |
| 0.25 Step + 0.75 Linear | 0.25 (Ok Judder) |
| 0.0 Step + 1.0 Linear | 0.00 (No Visible Judder) |

DETECTION OF AMOUNT OF JUDDER IN VIDEOS

CROSS REFERENCE TO RELATED APPLICATIONS

Pursuant to 35 U.S.C. § 119(c), this application is entitled to and claims the benefit of the filing date of U.S. Provisional App. No. 63/483,508 filed Feb. 6, 2023, entitled "DETECTION OF AMOUNT OF JUDDER IN VIDEOS", the content of which is incorporated herein by reference in its entirety for all purposes.

BACKGROUND

When viewing a video on a display, some problems in the visual presentation may result. For example, if high dynamic range (HDR) cinematic content is displayed in its original form, such as at a 24 frame per seconds (FPSs), temporal aliasing may result. For example, a type of aliasing referred to as judder may become evident and undesirable to view. Judder may refer to the jerky motion observed frame to frame when the camera or object moves too fast relative to the frame rate and shutter angle such that the object on screen appears to move in discreet jumps. Judder may be compensated for using certain mitigation techniques, such as motion smoothing or frame interpolation. For example, some televisions have frame interpolation features. However, the content may then have motion that looks temporally too smooth, and viewers may not like the smooth motion. This may become an artifact in itself and may be referred to as the soap opera effect. In both of the above cases, the original artistic intent and cinematic look may not be properly preserved.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations. The patent or application file contains at least one drawing executed in color. Copies of this patent or patent application publication with color drawing(s) will be provided by the Office upon request and payment of the necessary fee.

FIG. 3 depicts examples of temporal aliasing according to some embodiments.

FIG. 4 shows an example of aliasing of a frame according to some embodiments.

FIG. 6 depicts the components of a metric to quantify an amount of judder according to some embodiments.

FIG. 15 depicts a simplified flowchart of a method for performing judder mitigation according to some embodiments.

FIG. 16 depicts a table that includes different parameter settings according to some embodiments.

DETAILED DESCRIPTION

Described herein are techniques for a video processing system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

A system may analyze content of a video and determine a value for a metric that may quantify a type of aliasing in the video. For example, the metric may quantify an amount of aliasing referred to as judder. The system may use a judder perception function to determine a judder metric value. In some embodiments, the judder perception function determines the amount of judder based on a relationship between a magnitude of an intensity change in a direction of motion and the motion for a pixel (e.g., speed). The magnitude may be the absolute value of the intensity change. The judder perception function may quantify how much judder may be perceived by a viewer based on a non-linear relationship between the magnitude of the intensity change and the motion for a pixel. The system may output an amount of judder found in frames of the video.

The system may then perform a process to mitigate the judder. For example, the system may determine areas of the video that include judder, such as areas where the judder metric values for one or more frames meet (e.g., equal or exceed) a threshold. Then, the system may determine settings for mitigating the judder based on the judder metric values. A judder mitigation process may then be performed using the settings.

System Overview

Figure 1:
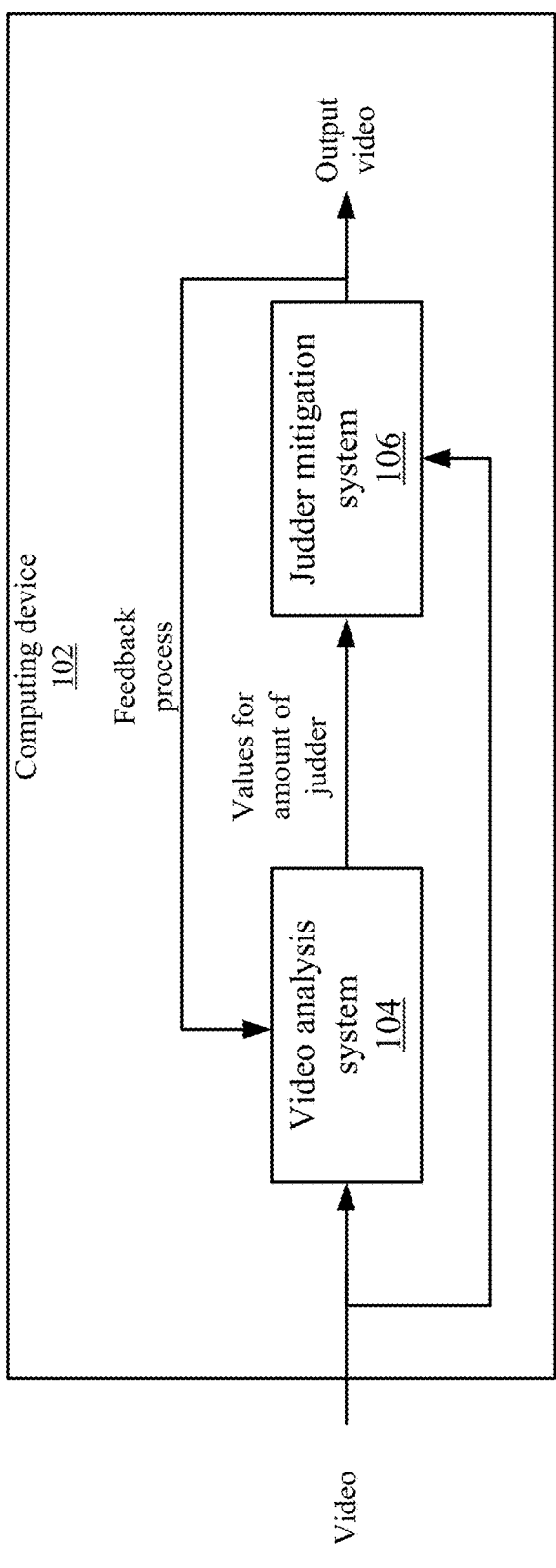
FIG. 1 depicts a simplified system for analyzing judder according to some embodiments.

FIG. 1 depicts a simplified system 100 for analyzing judder according to some embodiments. A computing device 102 includes a video analysis system 104 and a judder mitigation system 106.

Video analysis system 102 receives a video and analyzes the video for a type of aliasing, such as judder. The video may be content, such as a movie, show, or other forms of content. Video analysis system 104 may analyze frames of the video and generate a judder metric value that quantifies an amount of judder for respective frames. Video analysis system 104 may then output a judder metric value or judder metric values for the amount of judder in the video. The judder metric value may be a value for a portion of the video, which may be a frame, a set of frames, or an overall value for the video.

As discussed above, judder may be a form of temporal aliasing, and temporal aliasing may result in judder. When smooth, uniform motion captured on film or video is perceived as jerky or discontinuous motion when displayed, this phenomenon may be referred to as judder. The following will describe the basics of a signal, and how aliasing may result from sampling of the signal. Signals may be represented in a frequency domain by means of a Fourier transform. Essentially, the representation may be in a sine/cosine basis. This representation allows the frequency component present to be judged in a signal. Signals that do not have frequency components higher than a threshold "B" may be band limited. A signal may be band limited if the amplitude of its spectrum goes to zero for all frequencies beyond the threshold B. If a signal contains no frequencies higher than the threshold B, it is sufficient to sample the signal at a rate of 2B. When the sampling rate of up to a rate of 2B is violated, such as when sampling occurs below a rate of 2B, the reconstructed signal may exhibit imperfections that are referred to as aliasing. One problem is that signals are not band limited in a lot of videos. This means that aliasing may result in a lot of videos. For example, a video may be shot at a 24 FPS rate, such as for cinema. When displayed on another display device, such as a television or mobile phone, aliasing may result when the display device uses a different refresh rate, such as at 60 Hz. However, aliasing may even result in the video shot at 24 FPS and the refresh rate is the same.

Judder mitigation system 106 may process the video to mitigate judder. Different mitigation techniques may be used to mitigate the perceived judder. In some embodiments, judder mitigation system 106 may use the judder metric values to determine areas of the video in which the judder metric values meet (e.g., equal or exceed) a threshold. This may mean judder may be visible to a viewer. Then, judder mitigation system 106 may determine settings from the judder metric values. For example, the settings to perform frame interpolation are determined. Thereafter, judder mitigation system 106 performs judder mitigation using one or more judder mitigation techniques. The video with the mitigated judder may be re-analyzed by video analysis system 102. The process described above may be performed again to mitigate any judder that still exists in the video. Feedback may also be used to adjust settings of the video analysis system 102 or judder mitigation system 106. For example, the process to generate judder metric values or mitigate judder may be adjusted. In some embodiments, the settings for a judder mitigation process may be adjusted to improve the judder mitigation based on the feedback. Also, the judder perception function may be adjusted to improve the generation of the judder metric values.

The following will describe aliasing types, the judder measurement process, and then judder mitigation.

Aliasing Types

Figure 2:
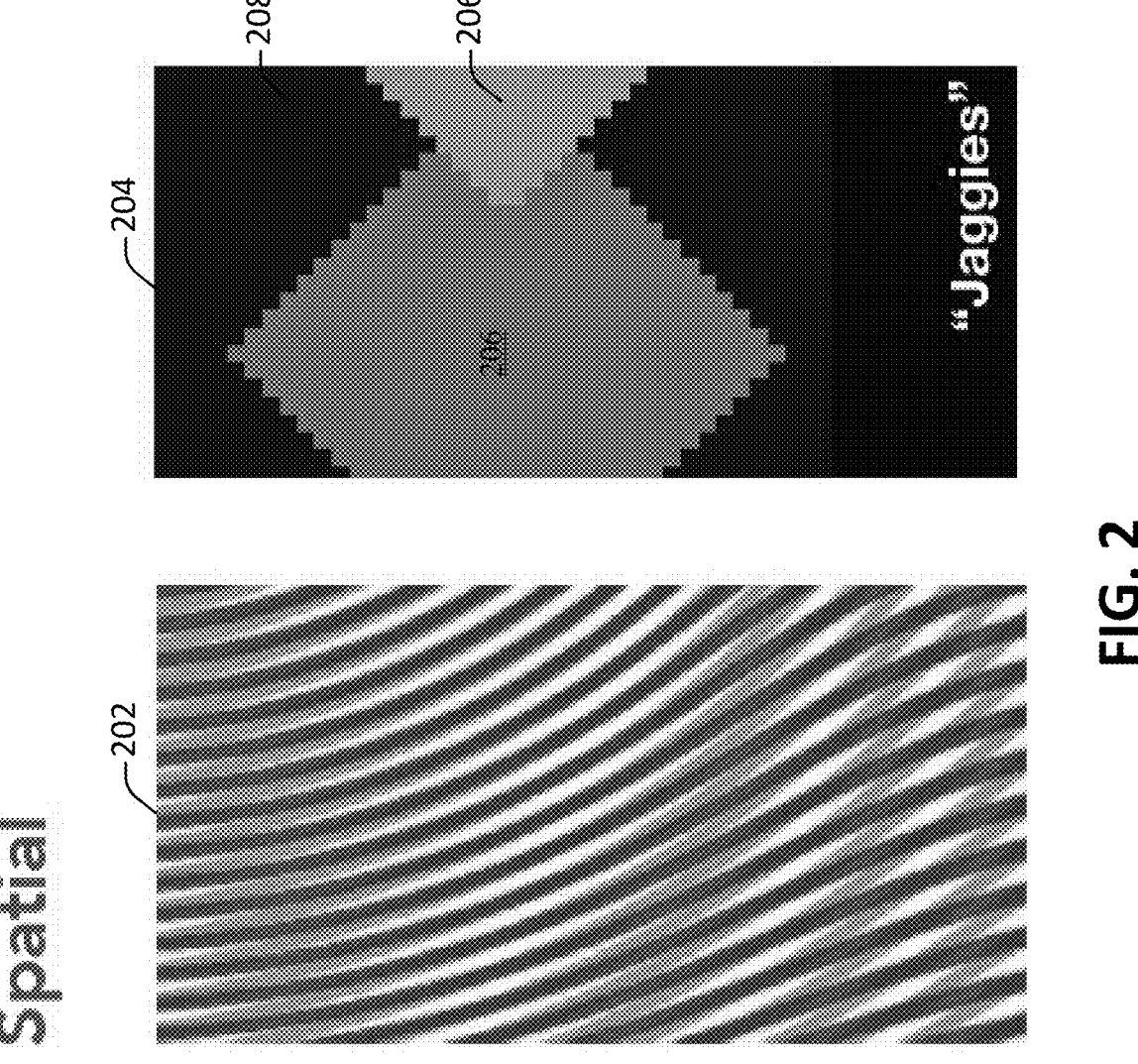
FIG. 2 depicts an example of spatial aliasing according to some embodiments.

FIGS. 2 and 3 show different types of aliasing according to some embodiments. FIG. 2 depicts an example of spatial aliasing according to some embodiments. At 202, aliasing results in lines being created in the image that should not be present.

At 204, aliasing results in jagged edges, which may be referred to as jaggy edges or jaggies in the image. Instead of a smooth outline, the objects shown at 206 have jaggy edges that appear as steps instead of a straight line between the border of the objects and the background at 208. A method of anti-aliasing to remove the aliasing may include better sampling, which may sample an area using an improved sampling method to sample the object such that jaggy edges do not occur, or blurred lines do not occur. However, finer sampling at a higher rate may not be possible in the spatial domain, such as because the spatial resolution of a display may be fixed, such as with a television or smartphone.

FIG. 3 depicts examples of temporal aliasing according to some embodiments. Temporal aliasing may result in judder. At 302, when temporal aliasing occurs, the wheel may appear to go backwards. The camera's shutter captures the spokes of the wheels in a different position in each frame, but the timing of the shutter relative to the position of the spokes of the wheel means that the wheels appear to go backwards rather than forwards. In this example, the temporal aliasing may not result in judder. At 304, a time slice of an image reveals jaggy edges that result from the temporal aliasing. In this example, judder may result. Some anti-aliasing methods may be used, such as finer sampling using frame interpolation or better sampling such as computational shutter effects.

FIG. 4 shows an example of aliasing of a frame according to some embodiments. At 402, a frame of a video (frame 175) is shown. At 404 a slice of that frame is captured and shown at 406. Within the slice at 406, jaggy edges may result.

Figure 5:
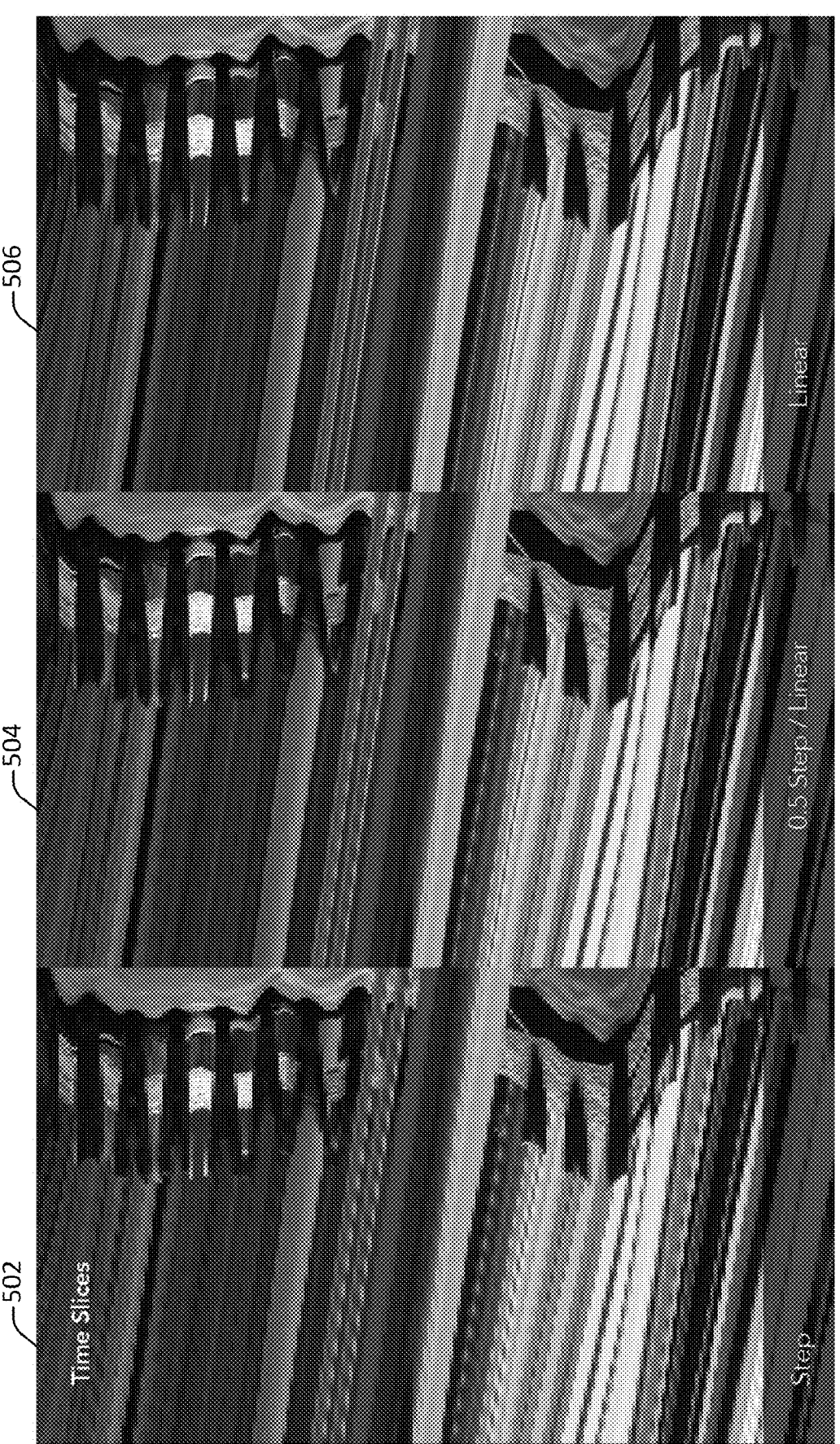
FIG. 5 depicts an example of different judder mitigation techniques according to some embodiments.

Judder mitigation may be performed on the frame to lessen the judder that is perceived. FIG. 5 depicts an example of different judder mitigation techniques according to some embodiments. At 502, a step interpolation may be used; at 504, a 0.5 step/linear interpolation may be used; and at 506, a linear interpolation may be used. Frame interpolation may add new frames to the video between existing frames. The new frames may increase the frame rate of the video making motion appear smoother and reducing judder. Linear interpolation may estimate values that fall between two frames in a straight line approximation. For example, the linear interpolation may be interpolate pixel values based on this frame and the next frame. A new frame is generated with the interpolated values. Step interpolation may keep the value of the pixel the same over multiple frames. New frames are generated with the same pixel values. The 0.5 step/linear interpolation applies the step and linear interpolations together in combination with 0.5 weight to each. Other weights may also be used (see, e.g., FIG. 16). The different interpolations may improve the perceived aliasing. For example, jaggy edges may be more pronounced in the time slice at 502, less pronounced in the time slice at 504, and even less pronounced in the time slice at 506.

Different combinations of step interpolation and linear interpolation may be used to mitigate judder. As will be described below in FIG. 14, the judder metric values may be used to select the settings, such as one of the different combinations of step interpolation and linear interpolation. Other interpolation methods may also be used.

Judder Measurement

The following will now describe the components of judder. In the above examples, the appearance of judder may result in jaggy edges. Using this observation, for the jaggy edges to appear, two conditions may be necessary. First, the image may have an image structure, such as image structure boundaries or visual spatial edges, within a given frame and the image structure moves in a direction that is not parallel to the structure, such as the edge. That is, judder may only be visible when the frame contains some texture. For example, no judder may be found on a white frame. In some embodiments, the more visible the spatial edges are and the more motion there is that is not parallel to the edge, the more judder will be observed. For maximum judder to be perceived, an image structure boundary or edge is required to move orthogonal to its direction along the boundary. That is, holding all other variables constant, maximum judder will be perceived when a content boundary moves in the direction of its positive or negative gradient. Accordingly, components of the conditions in which jaggy edges may appear may be used to quantify an amount of judder.

FIG. 6 depicts the components of a metric to quantify an amount of judder according to some embodiments. Video analysis system 104 may generate values for a metric associated with the temporal aliasing that leads to jaggy edges in video time slices, such as shown at 304 in FIG. 3. Referring to FIG. 6, at 602, an image f(x) is shown. The image may include an image structure at 606, which is shown with visible edges in the image. Specifically, the function f may be a mapping that takes an input argument, x, and maps it to an output. The inputs to the function f are from a domain Ω that is a subset of R^2 ("tuple of two real numbers") and the outputs are in R (real numbers). The inputs correspond to the domain of the function and the outputs to the co-domain. In an example, if the image size is 1920×1080 pixels, the inputs to the function f(x) would be any tuple of real numbers in [0,1920]×[0,1080]. For example, an input of [1234.12, 512.97] denotes a location in the image. The output would be a real number denoting the intensity value at that location, such as 127.53.

At 604, a motion field shows a motion vector v(x) of the image. The motion vector may represent a rate of change of image structure 606, such as per pixel motion. Specifically, the function v(x) may be a mapping that takes an input argument, x, and maps it to an output. The inputs to the function v are from a domain (2 that is a subset of R^2 ("tuple of two real numbers") and outputs are in R^2 ("tuple of two real numbers"). In an example, if the image size is 1920×1080 pixels, the inputs to the function f(x) would be any tuple of real numbers in [0,1920]×[0,1080]. For example, an input of [1234.12, 512.97] denotes a location in the image. The output would be a real number denoting the intensity value at that location, such as 127.53.

Figure 7:
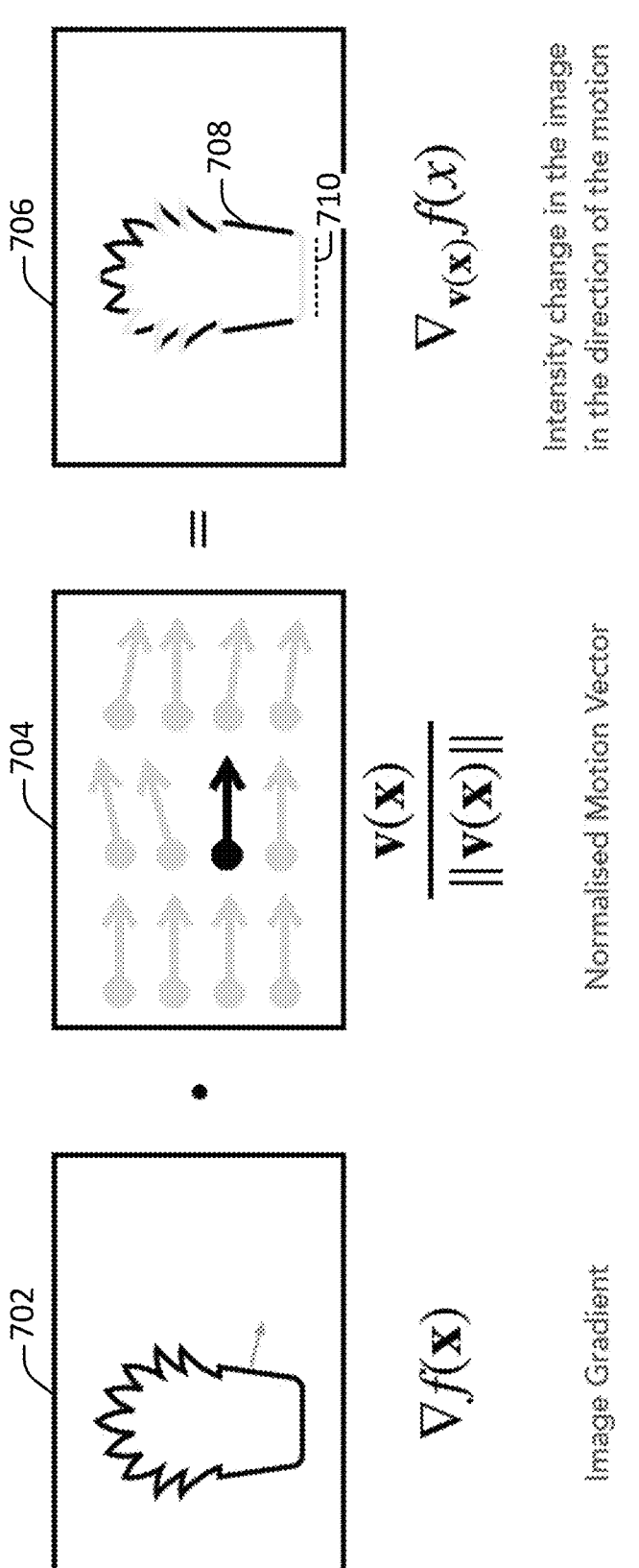
FIG. 7 depicts an example of a measurement to measure judder according to some embodiments.

FIG. 7 depicts an example of a measurement to measure judder according to some embodiments. At 702, an image gradient $\nabla f(x)$ may measure the difference of a value for a pixel compared to neighboring pixels. The value may be based on a characteristic, such as color value, intensity, etc. The image gradient may be used to identify an image structure in the image. In some embodiments, the image gradient may compute a vector (dI/dx, dI/dy), where the x and y derivative of an image I using a forward discretization (e.g., dI/dx at location x,y would be f(x+1,y)−f(x,y) and dI/dy at location x,y would be f(x,y+1)−f(x,y)). For example, if a first pixel is selected, video analysis system 104 may compute the difference of a characteristic, such as a color value, between the first pixel and a second pixel. Other characteristics may be used, such as intensity. Then, video analysis system 104 computes the difference of a color value between the first pixel and a third pixel. The image gradient may be a vector of the two differences. In some embodiments, the second pixel may be a side neighboring pixel and the third pixel may be a bottom or top neighboring pixel in the direction of motion, but other pixels may be used. The image gradient may be calculated on the pixels in a single image. In some examples, I(x,y) may be the color value of the first pixel, I(x+1,y) may be the color value of the second pixel, and I(x,y+1) may be the color value of the third pixel, where x and y are coordinates in the frame. Different methods may be used to compute derivatives for the gradient. In general, the system may approximate the first order derivative using the current point (x,y), and the next point (x+1,y). The result may be the coefficients are (−1,1) so that the first derivative is approximated with −f(x,y)+f(x+1,y). Different numbers of pixels may be used, which may result in different coefficients that approximate the first order derivative.

At 704, video analysis system 104 may measure motion of pixels, such as using a motion vector. The motion vector may be a normalized motion vector $$\frac{v(x)}{\|v(x)\|}.$$

The normalized vector $\hat{v}$ of a non-zero vector v is the unit vector (vector of length of 1) in the direction of v. The motion vector may measure the motion of content at a pixel in multiple frames. For example, per pixel motion may describe the cartesian (x,y) position of—or the distance and direction to—where a content feature (e.g., image structure) in the current video frame appears in a subsequent (or previous) video frame. Distances may be measured in pixels. Direction may be measured in degrees or radians. F(x,y,n) may return the absolute (x', y') position in frame n+1 of the content at position (x,y) in frame n—or its distance and direction—from which the absolute position can be derived. The vector v(x) may be a function that measures the motion measured for content at a pixel with the coordinates x,y in a frame.

Video analysis system 104 may use the image gradient and the motion vector to determine a value that measures an amount of judder. Video analysis system 104 may use a mapping, such as a product (e.g., the dot product) of the image gradient and the motion vector to generate the measurement of judder. At 702, each pixel may be associated with an image gradient. At 704, each pixel may be associated with a motion vector value, such as a per pixel motion vector value. In some examples, a per pixel motion value may be a two-dimensional (2D) vector (u,v) where u describes the horizontal and v the vertical motion of content at a given pixel. If the pixel location is (x,y) where the motion value is (u,v), then this means in the next frame the contents of that pixel will have moved to (x+u, y+v). If the motion value unit is pixels, e.g., (u=3, v=0), the motion was three pixels horizontally. Different units may be used, such as the units may be converted. For example, if the image is displayed on a physical screen and the screen size and number of pixels is known, the system can compute the pixel size and convert from pixels to another unit, such as millimeters. The system can convert into angles/perceived motion on the retina using information about a viewer and viewing distance. Also, considering changes in frame rate, the system could also consider speed (displacement/time).

Video analysis system 104 may calculate a combination, such as the dot product or other mapping, of the image gradient and the motion vector for each pixel at 706. The result of the dot product may be a change in a value of a characteristic, such as an intensity change, in the image in the direction of the motion. The intensity change may be a change in intensity leading to some visible contrast in the video. The change may be a directional derivative, which represents the instantaneous rate of change of the function, moving through x with a velocity specified by v. The directional derivative denotes the rate of change/slope of a function f (e.g., f is the image I) in a specific direction v. Although intensity change is described, other characteristics that represent changes in the direction of motion may be used. Some pixels may move in parallel to the direction of the motion vector, such as the pixels shown in the edge in dotted lines at 710. Judder may not occur with this motion for these pixels of this edge at 710 or the judder may not be perceived by a viewer. However, when the edge at 708 moves in a direction that is not parallel to the edge, judder may be perceived by a viewer. The resulting judder metric value may capture the amount of judder that a human may perceive. For example, for the pixels in the edge at 708, video analysis system 104 may output a higher value for the judder metric value indicating a higher amount of judder may be perceived. For the pixels found in the edge at 710, video analysis system 104 may output a lower value that indicates a smaller amount of judder may be perceived. Eye motion may also affect the amount of judder. Per frame object motion may be used to measure the amount of judder in a frame, but eye motion may also be considered. For example, one process may deduce a global eye motion offset in the pixel space by tracking the eyes and the global offset may then be subtracted from the per pixel motion field that is calculated.

The use of a dot product may assume linearity. For example, when the amount of motion is doubled, but the strength of the edge is halved, the dot product would predict the same amount of judder. However, it may be possible that the linearity may not exactly hold for these two different quantities. Accordingly, video analysis system 104 may use a function, such as a judder perception function, that determines the amount of judder based on the relationship between a change, such as the intensity change, in the direction of motion and the motion for a pixel (e.g., speed). However, the dot product may still be used as a measurement of the amount of judder.

Figure 8:
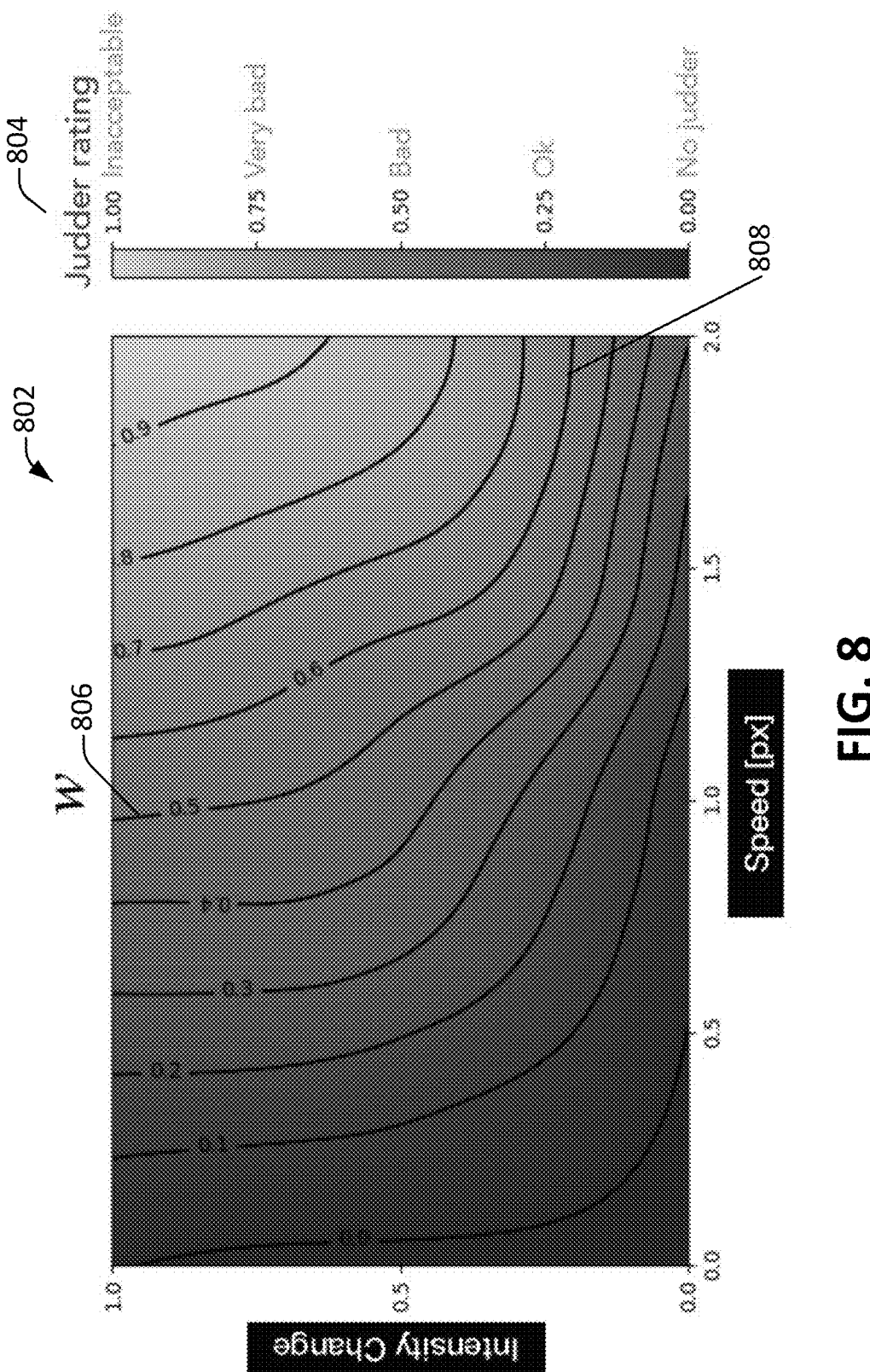
FIG. 8 depicts an example of a judder perception function according to some embodiments.

FIG. 8 depicts an example of a judder perception function according to some embodiments. A graph 802 depicts a relationship of first value, such as intensity change, in the direction of motion to a second value, such as the motion, which is represented by the speed of the pixel.

At 804, a judder rating for the relationship characterizes judder from a range of 0.0 to 1.00, but other ranges may be appreciated. In the range, a lower value may represent less judder may be perceived and a higher value may represent more judder may be perceived. In some embodiments, the value 0.00 may be associated with no judder being perceived, 0.25 may be associated with okay judder being perceived, 0.50 may be associated with bad judder being perceived, 0.75 is associated with very bad judder being perceived, and 1.00 is associated with unacceptable judder being perceived.

The value of the judder for a pixel may be determined based on the intersection of the intensity change and the speed in graph 802. For example, if the intensity change of around 0.9 and the speed of around 1.0 is associated with a pixel, then the judder measurement value may be 0.50 as shown at 806. However, if the speed for the pixel is around 2.0 and the intensity change is around 0.25, video analysis system 104 may measure the judder as 0.5 as shown at 808. Other values for the judder measurement may also be determined similarly. Depending on the relationship of the judder rating to the intensity change and speed, different variations in the amount of judder may exist when changes in the values of the intensity change or speed occur. For example, at 806, a small change in the speed of the pixel may result in a larger change in the judder measurement, such as from 0.5 to 0.4 or from 0.5 to 0.6. However, the change in speed at 808 may not result in a large change in the amount of judder. For example, a lower speed at 1.75 may result in the same or similar amount of judder. When using the dot product, the judder perception function may be represented with amounts of judder that vary linearly as changes in the intensity change and motion occur.

The judder perception function may measure how much judder may be perceived by a viewer. In some embodiments, the judder perception function may be generated using different methods. The factors that contribute to the perception of judder are weighted by the judder perception function coefficients. These factors may include, but are not limited to, capture frame rate, playback frame rate, content boundary contrast, content boundary sharpness, direction of motion with respect to content boundary, magnitude of motion, or a combination thereof.

The different weights may contribute to different perceptions of judder for a video. Observations from human users may be used to generate the judder perception function. In some examples, an object moving at a defined trajectory (e.g., across the screen horizontally) may be displayed. The object speed and brightness may be varied, and input from the human user may be received based on the subjective amount of judder perceived for different settings. This creates a kind of elementary stimulus to measure the relationship between the intensity change and the speed to determine the final amount of perceived judder. The input may be based on the judder rating scale shown at 804 in FIG. 8. For example, input from the human user may indicate a value between 0%-100%. Accordingly, the judder perception function may change based on different contents of the video, and may also vary non-linearly. Also, the judder perception function may also be generated automatically using a model that generates observations of judder from a video. For example, the model may ingest the video and be trained to generate observations that rate the amount of judder. Also, when there are the different factors contributing to judder along with human observations, the weights can be optimized to make the judder function match as closely as possible to all human observations. Or based on some human observations for all kinds of different combinations of factors, the values of the judder perception function may be interpolated.

Figure 9:
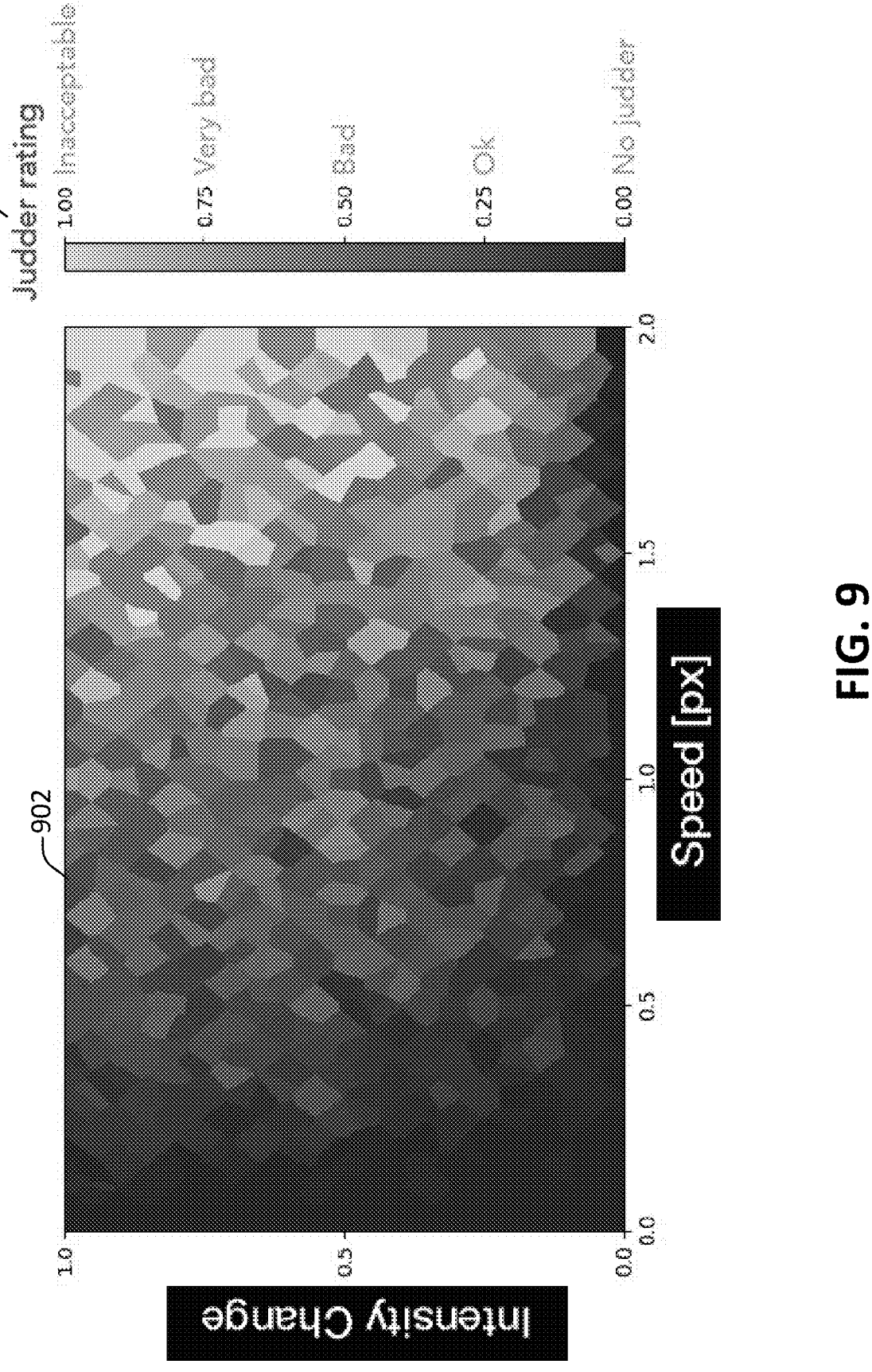
FIG. 9 depicts an example of judder measurement values from input according to some embodiments.

FIG. 9 depicts an example of judder measurement values from input according to some embodiments. At 902, the received judder rating values for the different intensity changes and speeds are shown. The judder rating scale is shown at 904. The different ratings are illustrated at 902 and are used to generate the judder perception function. Although the relationship is expected to be nonlinear, the noise in individual measurements may be removed using noise reduction techniques. For example, video analysis system 104 may fit a smoothing thin plate spline to the measurement values to obtain the final judder perception function. Video analysis system 104 may generate the judder perception function using other methods, such as using machine learning. For example, a prediction network may be trained to output judder ratings for different settings based on different viewing conditions.

The judder measurement values may be associated with the viewing conditions of a video. For example, the viewing conditions may be associated with a device type, a brightness, a background lighting, a color profile, and other conditions. Different judder perception functions may be used when viewing conditions are different. For example, different judder perception functions may be used for different device types or background lighting. Also, video analysis system 104 may automatically adjust a judder perception function for different conditions. For example, video analysis system 104 may use interpolation to adjust a first judder perception function that was generated using first viewing conditions to generate a second judder perception function based on changed viewing conditions from the first viewing conditions.

Figure 10:
FIG. 10 depicts an example of a measurement that can be used to determine the amount of judder for the gradient and motion of content at pixels according to some embodiments.

FIG. 10 depicts an example of a measurement that can be used to determine the amount of judder for the intensity change and motion of content at pixels according to some embodiments. Video analysis system 104 may use the following to compute the amount of judder:

$$J(t) = \sum_{x,y} w(|\nabla_{v(x)} f(x)|, \|v(x, y)\|),$$

where the value of J(t) is an amount of judder at a time t in a video, the variable $\nabla_{v(x)}f(x)$ may be the intensity change in the direction of motion, the variable $v(x,y)$ may be the motion of content at the pixel, and the function w may be the judder perception function of the magnitude of the intensity change and the direction of motion. In the above, the judder perception function as shown, for example, in FIG. 8, may use the values of the magnitude of intensity change in the direction of motion and the magnitude of the speed of the pixel to determine the judder measurement for the respective pixel at the position $(x,y)$ in a frame. Video analysis system 104 may aggregate, such as sum, the judder measurement values for each pixel of a frame to generate the amount of judder for the frame. Other methods may be used, such as averaging, selecting a median, etc.

Figure 11:
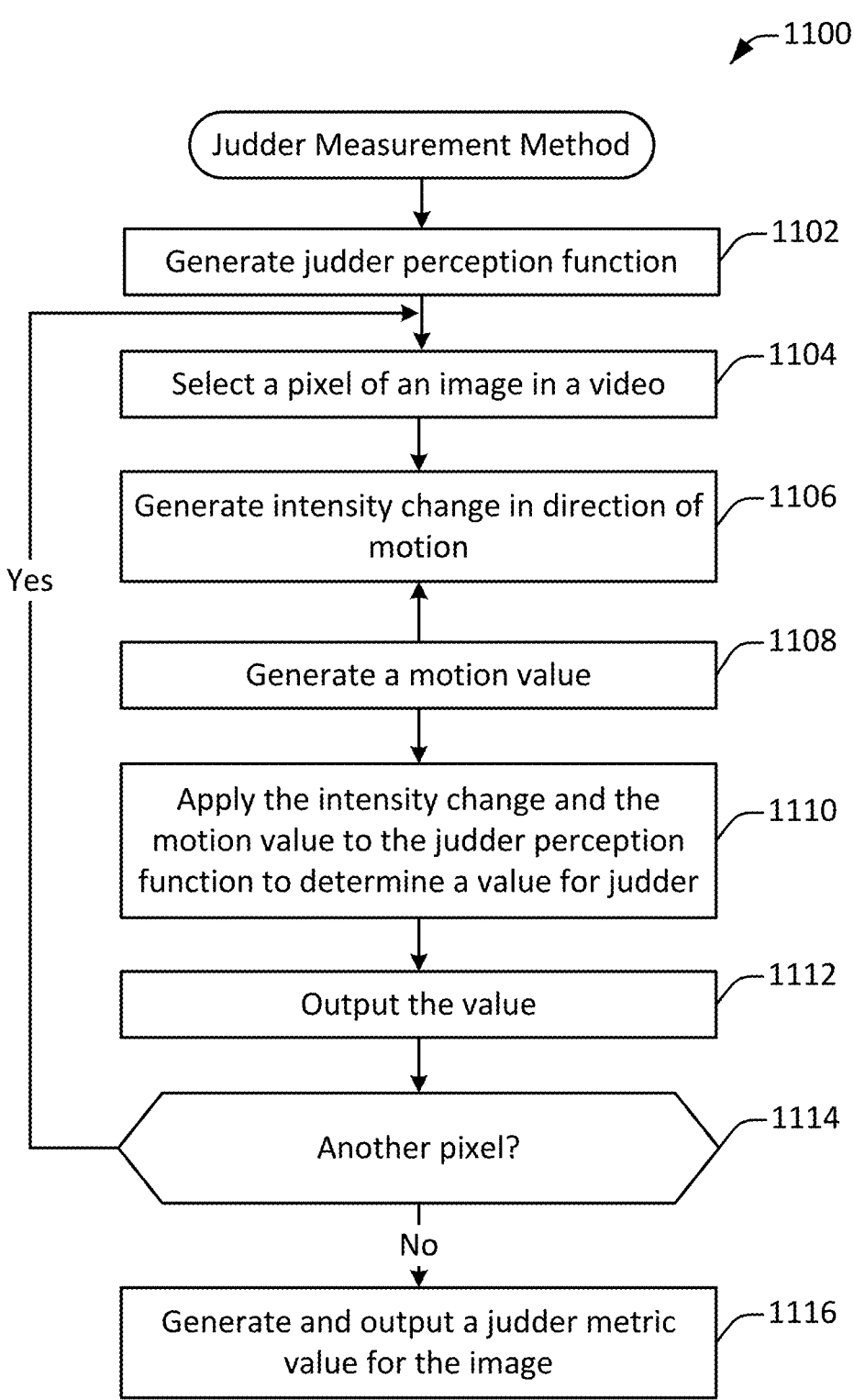
FIG. 11 depicts a simplified flowchart of a method for measuring an amount of judder according to some embodiments.

FIG. 11 depicts a simplified flowchart of a method for measuring an amount of judder according to some embodiments. At 1102, video analysis system 104 generates a judder perception function. The judder perception function may receive values of judder ratings from users. Based on the settings that are used to display the information in which the rating was received, video analysis system 104 generates the judder perception function.

At 1104, video analysis system 104 selects a pixel of a video. The pixel that is selected may be based on a scan of pixels of the frame, such as a raster scan, random selection, selection of portions of pixels, etc. For example, video analysis system 104 analyzes pixels of frames of a video. As discussed above, video analysis system 104 analyzes two characteristics for every pixel. For example, at 1106, video analysis system 104 generates an intensity change in the direction of motion of content at a pixel. Also, at 1108, video analysis system 104 generates a motion value for the pixel. For example, video analysis system 104 determines the magnitude of the intensity change for a pixel and a magnitude of the motion of content at a pixel.

At 1110, video analysis system 104 applies the intensity change in the direction of motion and the motion value of the pixel to the judder perception function to determine a value that measures the amount of judder for the pixel. At 1112, video analysis system 104 outputs the value. Then, at 1114, video analysis system 104 determines if another pixel in the frame needs to be analyzed. In some embodiments, video analysis system 104 analyzes every pixel in the frame. However, video analysis system 104 may not analyze every pixel in the frame. For example, video analysis system 104 may analyze a portion of pixels in the frame. In some examples, regions with zero motion may not need to be analyzed.

If there are other pixels, the process reiterates to 1104 and another pixel is selected for analysis. The process then proceeds to determine a value that measures an amount of judder for the new pixel. If another pixel does not need to be analyzed, at 1116, video analysis system 104 generates a value that measures an amount of judder for the frame and outputs the value. The value for the frame may aggregate the values for each pixel, such as using a summation. Also, video analysis system 104 may perform clustering detection and only consider judder values that are clustered in a group that meets a threshold, such as an amount of judder occurs in an area of a frame.

Figure 12:
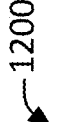
FIG. 12 depicts a graph that summarizes the judder metric values for a video according to some embodiments.

Video analysis system 104 may perform the above analysis for each frame of the video. The values that measure the amount of judder for each frame may be used to identify areas in the video in which judder may be perceived. For color images with multiple channels (e.g., different components, such as colors), video analysis system 104 may aggregate the judder metric values across all channels: f: $\Omega \subset R^2 \rightarrow R^3$. FIG. 12 depicts a graph 1200 that summarizes the judder metric values for a video, such as a frame with a waiter shown in FIG. 4, according to some embodiments. The X-axis of graph 1200 may be the frame number and the Y-axis may be the value of the amount of judder. A curve 1202 may represent the values of judder for respective frames of the video. As can be seen, the value of judder may vary over the number of frames in the video. At certain times, the value may be very high, such as around frames 350 to 400 or frames 525 to 550, which may indicate judder may be perceived and bad. Also, the value may be low, such as around frames 0 to 100 and frames 600 to 700, which may indicate judder may not be perceived and ok. In some embodiments, judder mitigation system 106 may compare judder metric values to a threshold to determine areas of the video in which judder mitigation may be performed. In some embodiments, portions of a video where frame meet a threshold are determined, such as frames 350 to 400 or frames 525 to 550 meet a threshold (e.g., are above) of around 6000. Also, video analysis system 104 may use a sliding window and a combination, such as an average of the judder metric values in the window may be used to determine when the frames in the window meet the threshold. Other methods may also be used. In some embodiments, consecutive frames may be determined, but single frames may also be determined. Clustering may also be performed to combine nearby frames to form an area that may have higher judder metric values.

After determining the judder metric values, judder mitigation system 106 may perform judder mitigation.

Judder Mitigation

Figure 13:
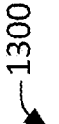
FIG. 13 depicts a graph illustrating the amount of judder using different judder mitigation techniques according to some embodiments.

Different mitigation techniques may be used to mitigate the perceived judder. FIG. 13 depicts a graph 1300 illustrating the amount of judder using different judder mitigation techniques according to some embodiments. For example, for a first judder mitigation technique (e.g., step interpolation), a curve 1302 illustrates the amount of judder across frames of the video. Also, a second judder mitigation technique (e.g., step/linear interpolation) may be used and a curve 1304 illustrates the amount of judder across frames of the video using this technique. Further, a curve 1306 represents the judder for a third judder mitigation technique (e.g., linear interpolation). As shown, generally, the first judder mitigation technique reduces a first amount of judder, the second judder mitigation technique reduces a second amount of judder, and the third judder mitigation technique reduces a third amount of judder in the video. This illustrates that different mitigation techniques may result in different judder mitigation. However, for different videos, different judder mitigation techniques may reduce the amount of judder differently. The values for the judder metric may be used to select which judder mitigation technique to use.

Figure 14:
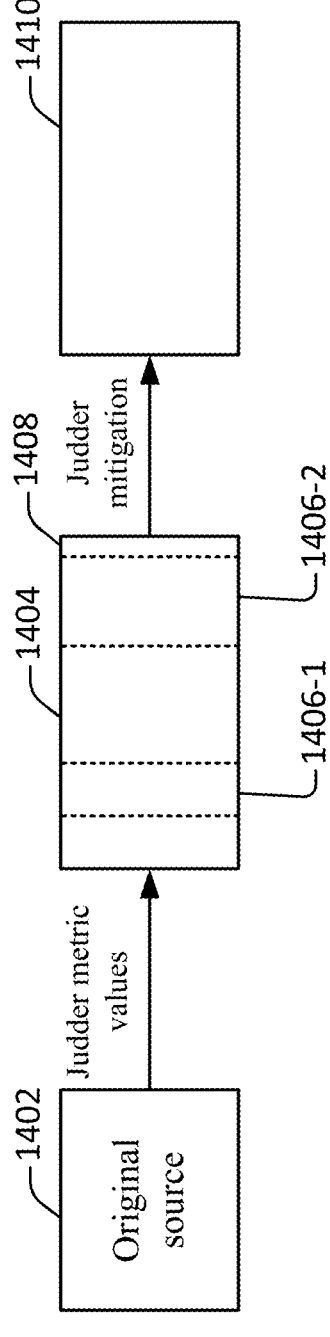
FIG. 14 shows an example of applying judder mitigation techniques according to some embodiments.

The values of the judder metric may be used to perform judder mitigation. In some embodiments, there may only be portions of the video that may require judder mitigation. For example, as discussed above, judder mitigation system 106 may compare judder metric values to a threshold to determine areas of the video in which judder mitigation may be performed. FIG. 14 depicts portions of the video in which judder mitigation may be performed according to some embodiments. At 1402, judder metric values that were generated for an original source video are received. At 1408, the result of analyzing the judder metric values shows different areas in the video in which the judder metric values either meet a threshold or do not, which classify portions as bad or good. For example, a good region 1404 may be where the judder metric values do not meet a threshold (e.g., are below a threshold) and judder may not be perceived. Also, bad regions 1406-1 and 1406-2 may be where the judder metric values meet a threshold (e.g., are above a threshold) and judder may be perceived. Then, the bad regions 1406-1 and 1406-2 may have judder mitigation performed. At 1410, a video with judder metric values that do not meet a threshold may be generated. That is, judder may not be visible in the video after judder mitigation is performed.

FIG. 15 depicts a simplified flowchart 1500 of a method for performing judder mitigation according to some embodiments. At 1502, judder mitigation system 106 receives judder metric values for a video. For example, video analysis system 104 generates the judder metric values for judder mitigation system 106. At 1504, judder mitigation system 106 compares judder metric values to a threshold to select areas of the video with judder that can be mitigated. For example, the areas at 1406-1 and 1406-2 may be determined in FIG. 14. Different judder mitigation techniques may be applied for different portions of the video in which judder is being experienced. Further, different judder mitigation techniques may be applied to a specific portion of video. The following will describe the judder mitigation for each portion of video, and the process can be performed for each portion.

At 1506, judder mitigation system 106 determines parameter settings for the areas based on respective judder metric values for each portion. The parameter settings may be based on the respective judder metric values for each portion, which means the parameter settings may be similar or different for portions. FIG. 16 describes an example of different settings, which may be a combination of different frame interpolation settings.

At 1508, judder mitigation system 106 performs judder mitigation with the respective settings for portions. In some embodiments, judder mitigation system 106 applies the same settings for the entire portion. In other embodiments, judder mitigation system 106 may apply different settings for frames in the portion, such as per frame, per two or more frames, etc.

At 1510, the resulting video is analyzed to determine if judder mitigation should be performed again. For example, video analysis system 102 may analyze the video to determine whether the judder has been mitigated. Video analysis system 102 may analyze feedback on whether judder has been mitigated in the entire video or in portions of the video.

The resulting judder metric values may be compared to the threshold again as described in 1504. If judder has been sufficiently mitigated (e.g., does not meet a threshold), then further judder mitigation may not be needed. Other methods may also be used to determine whether judder mitigation should be performed again, such as only if a certain percentage of the video still has portions that include judder that meets a threshold. For example, if a small portion of a size that is below a threshold has judder that meets a threshold, then another process of performing judder mitigation may not be needed. Also, a number of judder mitigation processes may be limited, such as two rounds. Thus, at 1512, judder mitigation system 106 determines if judder mitigation should be performed with different settings. For example, if the judder metric values change, judder mitigation system 106 may use different parameters. Also, if the previous settings do not mitigate the judder, judder mitigation system 106 may try different settings.

When the judder mitigation is finished, at 1514, the video is output with the judder mitigated. The video in which judder mitigation has been applied may be encoded. The resulting encoded video may be an improved version of the encoded video compared to if judder mitigation was not used.

As discussed above, judder mitigation system 106 may select different parameter settings to perform judder mitigation. FIG. 16 depicts a table 1600 that includes different parameter settings according to some embodiments. Judder mitigation system 106 may determine a judder metric value for a portion of the video. For example, for each frame, judder mitigation system 106 receives the judder metric value. Then, judder mitigation system 106 determines the respective parameter setting for the judder metric value. For example, at 1606, if the judder metric value is 1.00, then the parameter setting is 1.0 Step interpolation and 0.0 Linear interpolation. Judder mitigation system 106 then uses that parameter setting to mitigate the judder for the frame. Also, at 1608, if the judder metric value is 0.75, then the parameter setting is 0.75 Step interpolation and 0.25 Linear interpolation. Other settings are provided for other judder metric values. As discussed above, the judder mitigation may be performed for different portions of the video. For example, judder mitigation may be performed on portions of a frame, frame by frame, on multiple frames, etc. The same settings may be used on the different portions.

The settings may be determined based on different processes. For example, videos may be processed with different settings to determine the amount of judder that results. The settings that result in less visible judder may be selected. For example, when the judder metric value is 1.0, it is determined that 1.0 Step interpolation+0.0 Linear interpolation reduces judder the best.

Conclusion

Accordingly, a method for generating values that may quantify the amount of judder found in the video is provided. The measurement of judder may be improved using the judder perception function. The values may be more accurate and provide values that can more accurately apply judder mitigation strategies.

System

Figure 17:
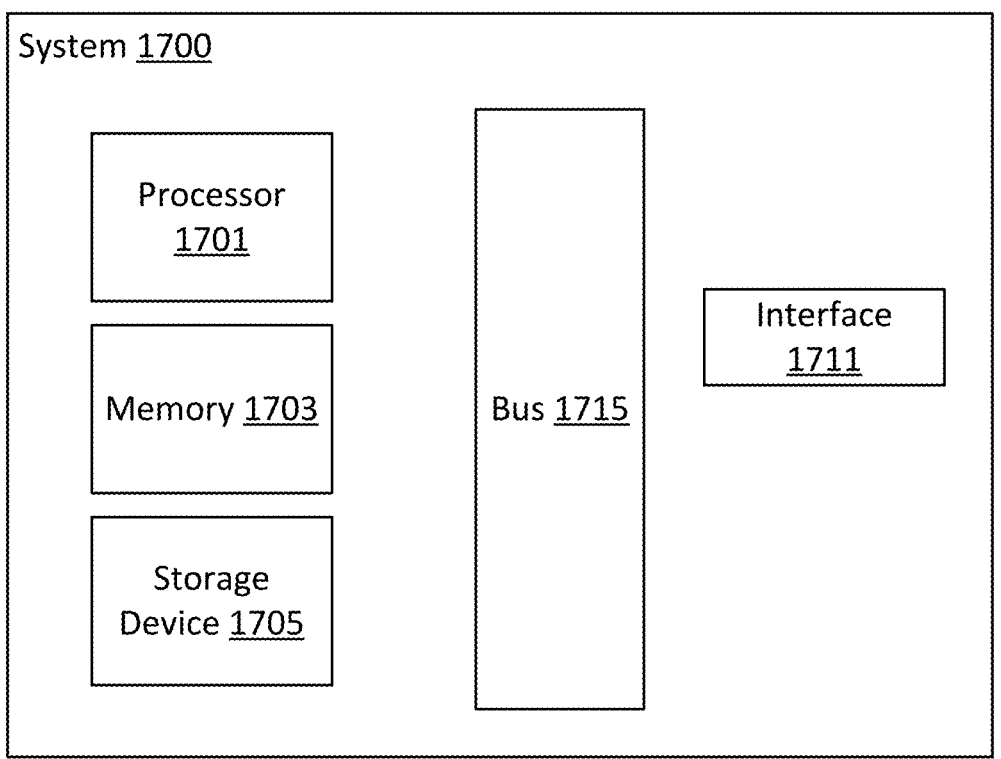
FIG. 17 illustrates one example of a computing device according to some embodiments.

FIG. 17 illustrates one example of a computing device according to some embodiments. According to various embodiments, a system 1700 suitable for implementing embodiments described herein includes a processor 1701, a memory 1703, a storage device 1705, an interface 1711, and a bus 1715 (e.g., a PCI bus or other interconnection fabric.) System 1700 may operate as variety of devices such as computing device 102, or any other device or service described herein. Although a particular configuration is described, a variety of alternative configurations are possible. The processor 1701 may perform operations such as those described herein. Instructions for performing such operations may be embodied in the memory 1703, on one or more non-transitory computer readable media, or on some other storage device. Various specially configured devices can also be used in place of or in addition to the processor 1701. The interface 1711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a," "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:

receiving, by a computing device, a video;

analyzing, by the computing device, information for a pixel of a frame in the video to determine a first value and a second value for the pixel, wherein:

the first value is based on an image structure formed by the pixel in the frame and the second value is based on interframe motion of the image structure at the pixel, the first value comprises a first change of a characteristic in a direction of the interframe motion of the image structure at the pixel, and the second value comprises a second change in the interframe motion of the image structure at the pixel;

determining, by the computing device, a third value for an amount of judder based on the first value and the second value; and outputting, by the computing device, the third value to evaluate the video.

2. The method of claim 1, wherein determining the third value for the amount of judder comprises:

using a function that represents a relationship based on the first value and the second value to determine the amount of judder.

3. The method of claim 2, wherein:

the first value comprises a magnitude of an intensity change of the pixel, the second value comprises the interframe motion of the image structure at the pixel, and the function represents a relationship between the magnitude of the intensity change and the interframe motion.

4. The method of claim 3, wherein:

the amount of judder is determined based on an intersection of the magnitude of the intensity change and the interframe motion using the function.

5. The method of claim 3, wherein:

the amount of judder varies non-linearly based on the magnitude of the intensity change and the interframe motion.

6. The method of claim 1, wherein determining the first value comprises:

determining a combination of an image gradient and the interframe motion of the image structure at the pixel to generate a magnitude of an intensity change in the direction of interframe motion.

7. The method of claim 6, wherein the image gradient comprises a difference of a characteristic between the pixel and another pixel.

8. The method of claim 1, wherein:

the frame comprises a first frame, and the interframe motion comprises a difference of a position of the pixel in the first frame and a second frame.

9. The method of claim 1, further comprising:

analyzing a plurality of pixels of the frame to determine respective first values for the image structure and respective second values for the interframe motion for the plurality of pixels;

determining a plurality of third values for the amount of judder based on the respective first value and the respective second value for the plurality of pixels; and determining a fourth value for the plurality of pixels using the plurality of third values.

10. The method of claim 9, wherein the fourth value represents the amount of judder for a portion of the video.

11. The method of claim 10, wherein:

the frame comprises a first frame, the portion of the video comprises the first frame, and one or more other fourth values is determined for one or more other frames.

12. The method of claim 1, wherein another pixel in another frame that includes interframe motion that is parallel to the direction of the interframe motion is not analyzed for an amount of judder.

13. The method of claim 1, further comprising:

determining an amount of judder for other frames;

identifying a portion of the video based on the amount of judder determined for the frame and the other frames; and performing a judder mitigation process on the portion of the video to mitigate the amount of judder.

14. The method of claim 1, further comprising:

determining an amount of judder for frames of the video, wherein the amount of judder for the frame is based on the amount of judder for the pixel;

comparing the amount of judder for the frames of the video to a threshold;

determining a portion of the video that meets the threshold; and performing a judder mitigation process on the portion of the video.

15. The method of claim 14, wherein performing the judder mitigation process comprises:

determining a setting for the judder mitigation process based on the amount of judder for frames of the portion of the video; and performing the judder mitigation process using the setting.

16. A non-transitory computer-readable storage medium having stored thereon computer executable instructions, which when executed by a computing device, cause the computing device to be operable for:

receiving a video;

analyzing information for a pixel of a frame in the video to determine a first value and a second value for the pixel, wherein:

the first value is based on an image structure formed by the pixel in the frame and the second value is based on interframe motion of the image structure at the pixel, the first value comprises a first change of a characteristic in a direction of the interframe motion of the image structure at the pixel, and the second value comprises a second change in the interframe motion of the image structure at the pixel;

determining a third value for an amount of judder based on the first value and the second value; and outputting the third value to evaluate the video.

17. The non-transitory computer-readable storage medium of claim 16, wherein determining the amount of judder comprises:

using a function that represents a relationship based on the first value and the second value to determine the amount of judder.

18. The non-transitory computer-readable storage medium of claim 16, wherein:

the first value comprises a magnitude of an intensity change in the direction of the interframe motion of the image structure at the pixel, and the second value comprises the interframe motion of the image structure at the pixel.

19. The non-transitory computer-readable storage medium of claim 16, further operable for:

analyzing a plurality of pixels of the frame to determine respective first values for the image structure and respective second values for the interframe motion for the plurality of pixels;

determining a plurality of third values for the amount of judder based on the respective first value and the respective second value for the plurality of pixels; and determining a fourth value for the plurality of pixels using the plurality of third values.

20. An apparatus comprising:

one or more computer processors; and a computer-readable storage medium comprising instructions for controlling the one or more computer processors to be operable for:

receiving a video;

analyzing information for a pixel of a frame in the video to determine a first value and a second value for the pixel, wherein:

the first value is based on an image structure formed by the pixel in the frame and the second value is based on interframe motion of the image structure at the pixel, the first value comprises a first change of a characteristic in a direction of the interframe motion of the image structure at the pixel, and the second value comprises a second change in the interframe motion of the image structure at the pixel;

determining a third value for an amount of judder based on the first value and the second value; and outputting the third value to evaluate the video.

* * * * *